March 18, 1947. J. R. HAGEMANN ET AL 2,417,486
NOZZLE CONSTRUCTION
Filed Feb. 19, 1943
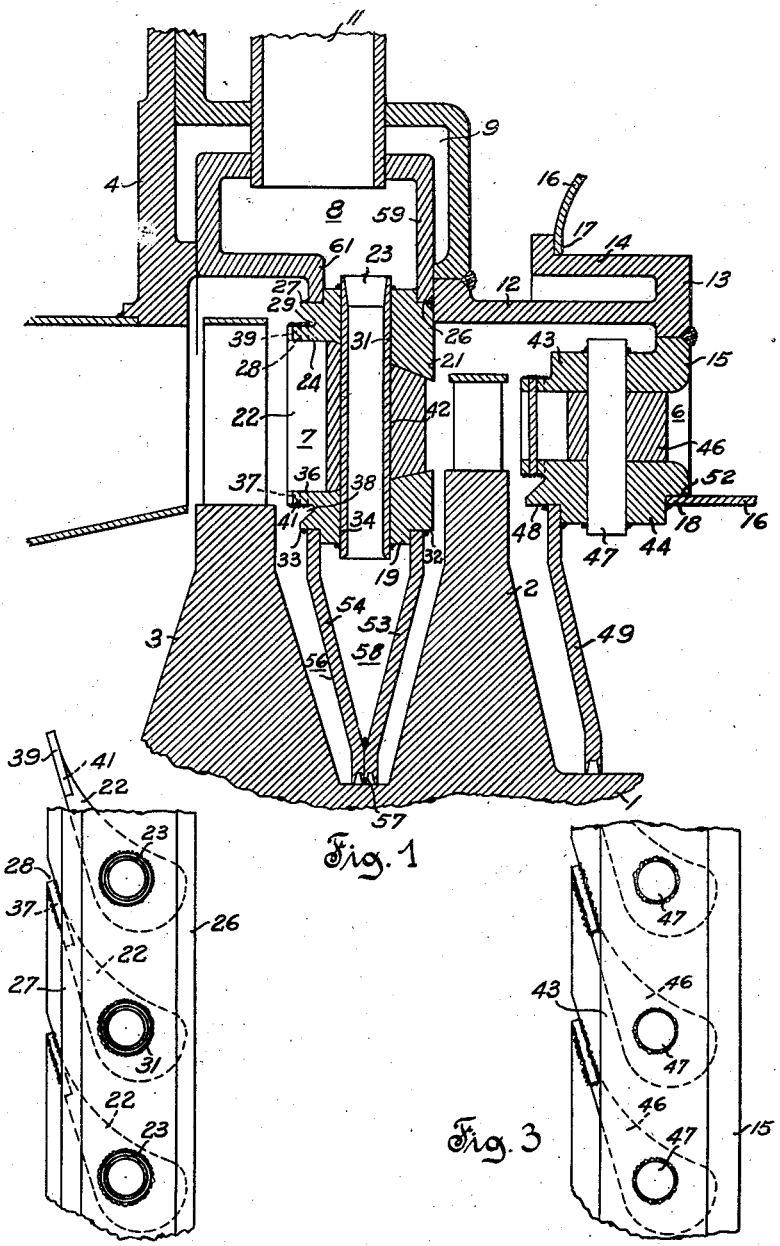
Inventors
J. R. Hagemann
J. A. Johnson
by K. S. Wyman
Attorney Patented Mar. 18, 1947

2,417,486

UNITED STATES PATENT OFFICE 2,417,486

NOZZLE CONSTRUCTION

John R. Hagemann, Wauwatosa, and John Algot Johnson, West Milwaukee, Wis., assignors to Allis-Chalmers Manufacturing Company, Milwaukee, Wis., a corporation of Delaware Application February 19, 1943, Serial No. 476,392

6 Claims. (Cl. 60—41)

1

The invention relates generally to elastic fluid turbine diaphragms and more particularly to a built-up diaphragm construction embodying nozzle passage defining blade or vane elements interposed between and secured to inner and outer disk forming ring elements.

The primary object of this invention is to provide an improved durable built-up diaphragm or nozzle construction which greatly facilitates the manufacture and assembly of the constituent parts and which permits the motive fluid confining passages and the throat portions thereof to be formed with extreme accuracy.

Another object of this invention is to provide an improved built-up diaphragm or nozzle portion which may be readily and cheaply manufactured with extreme accuracy and which is particularly applicable for use in constructing hollow, fluid cooled diaphragms.

In accordance with this invention, one or more of the above stated objects or portions thereof may be accomplished or attained with a construction embodying one or more of the following elements or features: (1) inner and outer ring elements each having a circumferential series of holes extending radially therethrough and an edge portion provided with a circumferential series of open-ended slots extending therethrough, an interposed vane element having a hole therethrough alined with a pair of opposed holes in said inner and outer ring elements and having on an edge portion thereof oppositely facing tabs or projections extending through a pair of opposed slots in the edge portions of said inner and outer ring elements, a pin element extending through said vane element and through said inner and outer ring elements, and weld metal uniting the exposed ends of said projections and the exposed ends of said pin element with inner and outer peripheral portions of said inner and outer ring elements, respectively.

The invention accordingly consists of the various features of construction, combinations of elements and arrangements of parts as is more fully set forth in the appended claims and in the detailed description, reference being had to the accompanying drawing, in which:

Fig. 1 is a partial longitudinal section through a turbine embodying the invention;

Fig. 2 is an enlarged developed partial plan view of the left hand diaphragm member embodied in Fig. 1; and Fig. 3 is an enlarged developed partial plan view of the right hand diaphragm or nozzle member shown in Fig. 2.

2

Referring to the drawing, it is seen that the invention may be embodied in an axial flow elastic fluid turbine having a spindle or rotor 1 provided with spaced coaxial blade carrying disks 2 and 3 and a casing 4 enclosing the spindle 1 and being provided with spaced coaxial nozzle and diaphragm members 6 and 7, respectively, disposed in coacting relation with respect to the blade carrying disks 2 and 3 as shown.

The casing 4 is preferably constructed in any suitable manner, such as by welding together suitable members, to provide an inner cooling fluid space 8 which is surrounded by an outer cooling fluid space 9 through which extends a cooling fluid admission duct 11 which terminates within the space 8; the inner wall of which is formed in part by the outer surface of the diaphragm member 7. The inlet end of the casing includes a radially flexible coaxial portion 12 which terminates in a relatively heavy radially extending flange 13 provided adjacent its outer periphery with a radially flexible coaxial portion 14 which extends in spaced surrounding relation about the portion 12 as shown. The nozzle member 6 is mounted in proximate coaxial relation to the blade carrying disk 2 and in concentric spaced relation within the portion 12 by having a radially extending portion 15 secured to the inner periphery of the flange 13. The inlet end of the casing 4 also includes a tubular manifold portion 16 having radially spaced edges one of which, 17, is secured to the free end of the coaxial portion 14 and the other of which, 18, is secured to the nozzle member 6 as shown. The construction of the casing as just described, which is merely illustrative and not essential for a complete understanding of this invention, is disclosed in detail and claimed in the copending application of Hans A. Altorfer, Serial No. 467,964, filed December 5, 1942.

The diaphragm member 7 comprises inner and outer radially spaced ring elements 19 and 21, respectively, interposed blade or vane elements 22, and interconnecting pin elements 23. The outer ring element 21 has on its outlet side a coaxial flange 24 forming a continuation of its inner fluid confining surface and has its outer surface provided with axially spaced, oppositely facing steps or shoulders 26 and 27 adapted to be abutted by and fusibly united or otherwise secured to complementary portions on the inner surface of the casing 4. The flange 24 is provided with a circumferential series of spaced open-ended slots 28 extending therethrough and the exposed upper surface of said flange may be increased by undercutting or otherwise forming a circumferential groove 29 beneath the tread portion of the step 27. Ring element 21 is also provided with a circumferential series of spaced holes 31 which extend radially therethrough intermediate the steps 26 and 27. The inner ring element 19 has its inner surface provided with axially spaced, oppositely facing steps 32 and 33 and also has a circumferential series of spaced holes 34 which extend radially therethrough intermediate the steps 32 and 33, a coaxial flange 36 on its outlet side provided with a circumferential series of spaced open-ended slots 37, and a circumferential groove 38 undercut or otherwise formed between the flange 36 and the step 33. The construction of the inner and outer ring elements is preferably such that when said elements are correctly positioned in the radially spaced opposed relation shown, the holes 31 and 34 which extend radially therethrough and the slots 28 and 37 which are formed in the flanges 24 and 36 are in substantial alinement.

The vane elements 22, which are preferably shaped as clearly indicated in Figs. 1 and 2, have their outlet portions provided with oppositely facing tabs or projections 39 and 41 adapted to extend within and substantially fill the slots 28 and 37 provided in the opposed flanges 24 and 36, respectively. The enlarged inlet portion of each vane element 22 has a hole or bore 42 extending therethrough for alinement with a pair of opposed holes 31 and 34 in the ring elements 21 and 19, respectively, when the tabs 39 and 41 are disposed within the slots 28 and 37 as shown in Fig. 1. The dimensions of the tubular pin elements 23 are preferably such that said elements fit snugly within the alined holes 31, 34 and 42 with their opposite ends extending slightly beyond the outer and inner surfaces of the ring elements 21 and 19, respectively.

The portion of the diaphragm member 7 hereinbefore described is quite similar to the corresponding portion of the nozzle member 6, and it should therefore be sufficient for a complete understanding of the construction of nozzle member 6 to merely point out that the outer ring element 43 of member 6 differs in material respects from the corresponding part of diaphragm member 7 only by the omission of the axially spaced steps 26 and 27 and the circumferential groove 29, that the inner ring element 44 and the interposed vane elements 46 of member 6 are identical in all material respects to those embodied in member 7, and that the interconnecting pin elements 47 of member 6 are solid, whereas the pin elements of member 7 are tubes.

Consequently, it should now be apparent that the hereinbefore described portions of diaphragm member 7 and nozzle member 6 can be readily assembled to form a unit comprising inner and outer ring elements, interposed vane elements and interconnecting pin elements either by holding the ring elements in their correct radially spaced opposed relation and sliding the vane elements therebetween until the tabs or projections 39 and 41 are disposed in the slots 28 and 37 and the holes 42 are alined with a pair of opposed holes 31 and 34 or by holding the vane elements in their correct spaced relation and sliding the inner and outer ring elements thereon until the slots receive the tabs or projections 39 and 41 and a pair of opposed holes 31 and 34 are alined with the hole 42 in the vane element. In carrying out the procedures just outlined, either the ring elements or vanes must be held in a suitable jig or the like (not shown in the interest of simplicity), and in this connection, it should be noted that in the first procedure outlined, the vane elements are inserted between the inner and outer ring elements from the flanged ends thereof whereas in the latter outlined procedure the inner and outer ring elements are slid over the vane elements from the inlet edge thereof. The ring and vane elements are preferably dimensioned so that the inner and outer radially spaced edges of the vane elements (the tabs or projecting portions thereof being excepted) are in continuous engagement with the opposed surface portions of the ring elements as indicated in Fig. 1.

When the assembly has been completed as just described, the pin elements are then inserted through the alined holes 31, 34, and 42 and positioned therein with the opposite ends of the pins projecting slightly beyond the inner and outer surfaces of the inner and outer ring elements, respectively. The assembly is then permanently secured together as a unit by welding or fusibly uniting the exposed ends of the pin elements to the surrounding surface on the ring elements and the exposed ends of the tabs or projections 39 and 41 to the outer and inner exposed surfaces on flanged portions 24 and 36, respectively, of said ring elements as indicated.

The nozzle element 6 is completed by welding to the stepped surface 48 on the inner ring element 44 a disk portion 49 adapted to sealingly surround the shaft portion of the turbine spindle in proximate axially spaced relation to the blade carrying disk 2. The nozzle element can now be secured to the casing portion 12 simply by welding the radially extending flange 15 on the outer ring element 43 to the opposed surface of the flange 13 on the casing portion 12. The manifold 16 can now be applied by welding its outer edge 17 to the casing portion 14 and its inner edge 18 to the stepped surface 52 on the inner ring element 44 as previously indicated.

The diaphragm member 7 is completed by welding axially spaced outer peripheral portions 53 and 54 of a hollow disk element 56 to the stepped surfaces 32 and 33 on the inner ring element 19. The hollow disk element 56, which may be fabricated as shown or otherwise formed, is preferably provided at its inner periphery with one or more sealing projections 57 adapted to coact with the spindle 1. Attachment of the hollow disk member 56 to the inner ring element 19 forms therewith an annular cooling space 58 which is adapted to be placed in communication with the inner cooling fluid space 8 in the casing 4 by means of the tubular pin elements 23. Member 7 is now complete and can be readily secured to the casing 4 simply by engaging the stepped surfaces 26 and 27 on the outer ring element 21 with the inward and circumferentially extending flanges or projections 59 and 61 on the casing 4 and welding these parts together as indicated.

The hereinbefore described construction for diaphragm and nozzle members permits the nozzle passages and throat portions thereof to be readily formed with extreme accuracy and in addition affords a simplified, compact and durable structure requiring a minimum amount of machining and fitting in connection with the assembly of same. Moreover, in this type of construction, all welds are performed on exterior surfaces which are readily accessible and therefore conducive to the formation of better welds with less effort and skill and in less time. Furthermore, the welding of the exterior surfaces only avoids deformation of the fluid confining passages and the throat portions thereof, thereby eliminating the tedious and expensive cleaning and finishing operations which are necessary whenever weld metal is deposited alongside contiguous surfaces defining such passages.

The invention is applicable to turbine diaphragm and nozzle members irrespective of the type of casing structure employed since such members can be readily secured in any type of casing simply by shaping the outer surface of the outer ring element to conform with the diaphragm or nozzle supporting portion of the casing to which it is to be secured. It should therefore be understood that it is not intended to limit the invention to the exact details of construction herein shown and described, as various modifications within the scope of the appended claims may occur to persons skilled in the art.

It is claimed and desired to secure by Letters Patent:

1. A diaphragm or nozzle construction comprising inner and outer ring elements each having a circumferential series of peripherally spaced holes extending radially therethrough intermediate its inlet and outlet edges and an outlet edge portion provided with a circumferential series of peripherally spaced open-ended slots extending transversely therethrough, an interposed vane element having in its inlet portion a hole therethrough alined with a pair of opposed holes in said inner and outer ring elements and having on its outlet portion oppositely facing projections extending through a pair of opposed slots in the outlet edge portions of said inner and outer ring elements to points remote from the opposed fluid confining surfaces of said elements, a pin extending through said vane element and through said inner and outer ring elements, and weld metal integrally uniting the ends of said projections remote from said fluid confining surfaces and the opposite ends of said pin with the proximate inner and outer exposed surface portions of said inner and outer ring elements, respectively.

2. A diaphragm or nozzle construction comprising inner and outer ring elements each having a circumferential series of peripherally spaced holes extending therethrough and an edge portion provided with a circumferential series of peripherally spaced open-ended slots extending transversely therethrough, an interposed vane element having a hole therethrough alined with a pair of opposed holes in said inner and outer ring elements and having on an end portion thereof oppositely facing projections extending through a pair of opposed slots in the edge portions of said inner and outer ring elements to points remote from the opposed fluid confining surfaces thereof, a pin extending through said vane element and through said inner and outer ring elements, and weld metal integrally uniting the exposed, oppositely facing ends of said projections and the exposed opposite ends of said pin with the proximate inner and outer exposed surface portions of said inner and outer ring elements, respectively.

3. A diaphragm or nozzle construction comprising inner and outer ring elements each having a circumferential series of peripherally spaced holes extending therethrough and an edge portion provided with a circumferential series of peripherally spaced open-ended slots extending transversely therethrough, interposed vane elements each having a hole therethrough alined with a pair of opposed holes in said inner and outer ring elements and each having on an edge portion thereof oppositely facing projections extending through a pair of alined slots in the edge portions of said inner and outer ring elements to points remote from the fluid confining surfaces thereof, a hollow tube extending through each of said vane elements and through said inner and outer ring elements, weld metal integrally uniting the ends of said projections remote from said opposed fluid confining surfaces and the opposite ends of said tubes with the proximate inner and outer exposed surface portions of said inner and outer ring elements, respectively, and an inner annular disk member having axially spaced outer peripheral portions fusibly united and forming with a portion of the inner peripheral surface of said inner ring element a cooling fluid chamber with which said tube communicates.

4. A diaphragm construction comprising inner and outer ring elements each having a circumferential series of peripherally spaced holes extending therethrough intermediate its inlet and outlet edges and an edge portion provided with a circumferential series of peripherally spaced open-ended slots extending transversely therethrough, interposed vane elements each having a hole therethrough alined with a pair of opposed holes in said inner and outer ring elements and each having on an edge portion thereof oppositely facing projections extending through a pair of alined slots in the edge portions of said inner and outer ring elements to points remote from the opposed fluid confining surfaces thereof, a hollow tube extending through each said vane elements and through said inner and outer ring elements, weld metal integrally uniting the ends of said projections remote from said opposed fluid confining surfaces and the opposite ends of said tubes with the proximate inner and outer exposed surface portions of said inner and outer ring elements, respectively, and an inner annular disk member having a first outer peripheral portion fusibly united with an inner peripheral surface portion of said inner ring element between the exposed ends of the projections and the ends of the tubes extending therethrough and having a second axially spaced outer peripheral portion fusibly united with an inner peripheral surface portion of said inner ring element on the other side of the exposed ends of said tubes, said outer axially spaced portions of said inner annular disk member forming with the inner intermediate surface portion of said inner ring element, a closed cooling chamber with which said tubes communicate.

5. In a diaphragm construction, a nozzle forming ring element having a circumferential series of peripherally spaced holes extending radially therethrough intermediate its inlet and outlet edges, having an exposed outlet edge portion provided with a circumferential series of peripherally spaced open-ended slots extending therethrough, and having formed thereon a first coaxial positioning shoulder disposed between said inlet edge and said peripherally spaced holes and a second coaxial positioning shoulder disposed between said circumferential series of slots and holes.

6. In a diaphragm construction, a nozzle forming ring element having a stepped peripheral surface presenting in coaxial relation a pair of axially spaced positioning shoulders and an axially extending edge portion, said element having formed therein a circumferential series of peripherally spaced holes extending therethrough intermediate said pair of positioning shoulders and a circumferential series of peripherally spaced open-ended slots extending through said edge portion.

JOHN R. HAGEMANN.
JOHN ALGOT JOHNSON.

REFERENCES CITED

The following references are of record in the file of this patent:

UNITED STATES PATENTS

| Number | Name | Date |
| --- | --- | --- |
| 1,653,217 | Koch | Dec. 20, 1927 |
| 1,928,504 | Schaper | Sept. 26, 1933 |